(12) United States Patent
Belgi et al.

(10) Patent No.: US 12,694,083 B2
(45) Date of Patent: Jul. 28, 2026

(54) AUTOMATIC PERFORMANCE OF ACCESS REVIEW UTILIZING A LARGE LANGUAGE MODEL (LLM)

(71) Applicant: VARONIS SYSTEMS, INC., New York, NY (US)

(72) Inventors: Amir Belgi, Ra'anana (IL); John Eugene Neystadt, Kfar Saba (IL); Ron Sneh, Atlit (IL)

(73) Assignee: VARONIS SYSTEMS, INC., New York, NY (US)

( * ) Notice: Subject to any disclaimer, the term of this patent is extended or adjusted under 35 U.S.C. 154(b) by 8 days.

(21) Appl. No.: 18/882,883

(22) Filed: Sep. 12, 2024

(65) Prior Publication Data

US 2026/0073028 A1     Mar. 12, 2026

(51) Int. Cl.
| | |
|---|---|
| *G06F 21/31* | (2013.01) |
| *G06F 40/00* | (2020.01) |
| *G06N 20/00* | (2019.01) |

(52) U.S. Cl.
CPC .............. *G06F 21/31* (2013.01); *G06F 40/00* (2020.01); *G06N 20/00* (2019.01)

(58) Field of Classification Search
CPC .......... G06F 21/31; G06F 40/00; G06N 20/00
See application file for complete search history.

(56) References Cited

U.S. PATENT DOCUMENTS

| | | |
|---|---|---|
| 2011/0093471 A1 | 4/2011 | Brockway et al. |
| 2012/0047575 A1 | 2/2012 | Baikalov et al. |
| 2012/0216243 A1 | 8/2012 | Gill et al. |
| 2014/0163967 A1* | 6/2014 | Aratsu .................... G06F 21/60 704/9 |
| 2019/0050476 A1* | 2/2019 | Florentino .............. G06F 16/34 |
| 2021/0224396 A1 | 7/2021 | Cunningham et al. |

(Continued)

OTHER PUBLICATIONS

Dzeparoska, Kristina, et al. "LLM-based policy generation for intent-based management of applications." 2023 19th International Conference on Network and Service Management (CNSM). IEEE. (Year: 2023).*

(Continued)

*Primary Examiner* — John M Macilwinen
(74) *Attorney, Agent, or Firm* — AlphaPatent Associates Ltd.; Daniel J. Swirsky

(57) ABSTRACT

Computerized systems and methods for automated Access Permissions Review in an organization. A method includes: (a) receiving a textual description of an Access Review Policy; (b) constructing a trigger for automatically initiating an Access Review process; (c) automatically collecting organizational data that pertains to: (i) roles and positions of users, (ii) user-specific characteristics, (iii) email messages sent and received by users, (iv) description of events in which users had accessed elements of the Organizational Resource. Upon a triggering of the trigger, the method provides to a fine-tuned Large Language Model (LLM), the Access Review Policy and augmentation data from the organizational data, and a prompt instructing the LLM to generate a proposal to revoke, modify, add or maintain the Access Permissions of a particular user, and further instructing the LLM to generate output that describes reasoning and supporting evidence for the proposal.

20 Claims, 2 Drawing Sheets

(56)  References Cited

U.S. PATENT DOCUMENTS

| | | | |
|---|---|---|---|
| 2024/0232393 A1* | 7/2024 | Nowak | G06F 21/604 |
| 2024/0249012 A1* | 7/2024 | Gayawar | G06F 16/3347 |
| 2025/0193244 A1* | 6/2025 | Singh | G06F 40/40 |

OTHER PUBLICATIONS

Narouei, Masoud, Hassan Takabi, and Rodney Nielsen. "Automatic extraction of access control policies from natural language documents." IEEE Transactions on Dependable and Secure Computing 17.3: 506-517. (Year: 2018).*
Tang, Chenhao, et al. "PolicyGPT: Automated analysis of privacy policies with large language models." arXiv preprint arXiv: 2309. 10238. (Year: 2023).*
Rodriguez, David, et al. "Large language models: a new approach for privacy policy analysis at scale." Computing 106.12: 3879-3903. Jul. 2024.*
PCT International Search Report in PCT/IB2025/058977, mailed on Nov. 18, 2025.
PCT Written Opinion in PCT/IB2025/058977, mailed on Nov. 18, 2025.

* cited by examiner

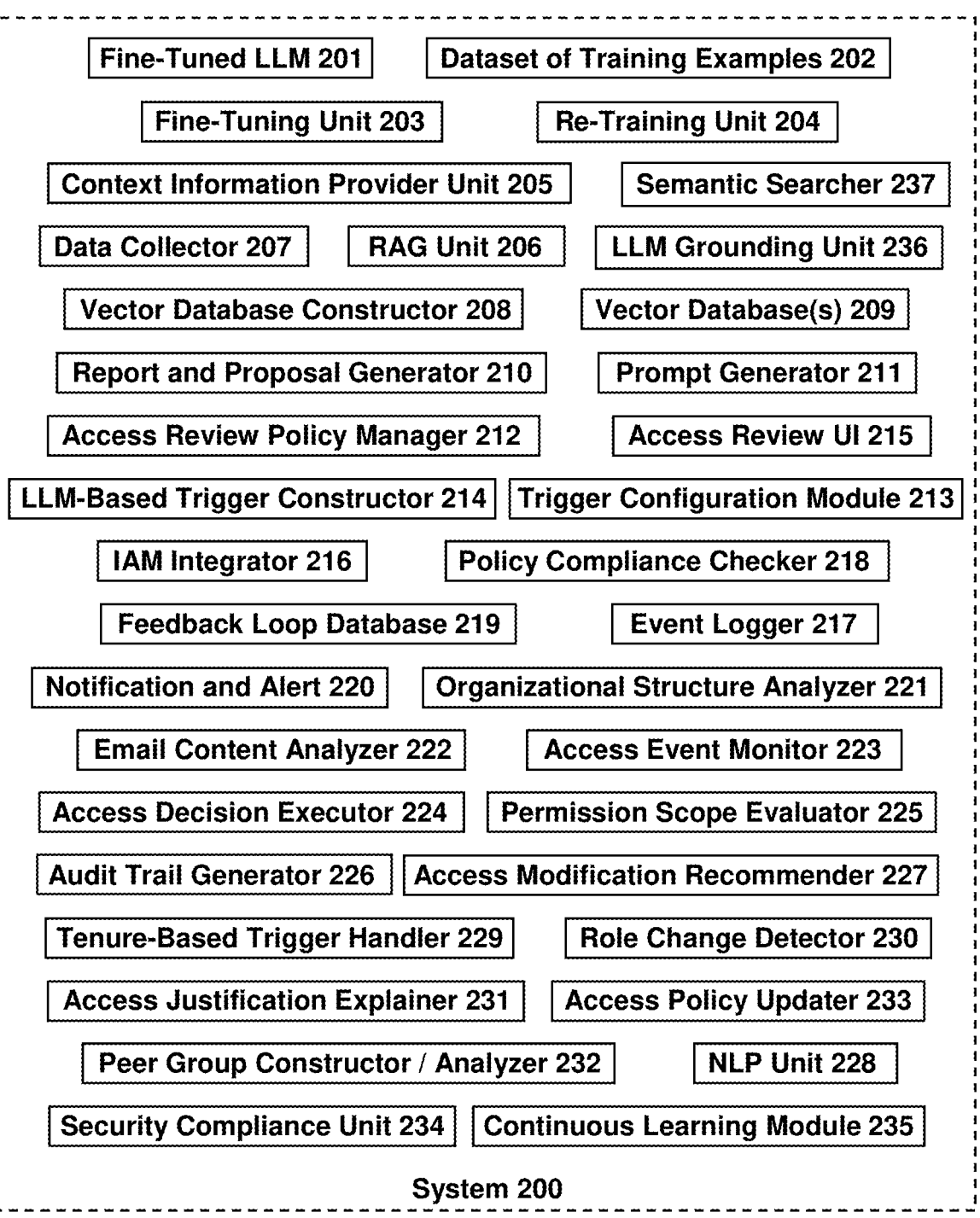

Fine-Tuned LLM 201    Dataset of Training Examples 202

Fine-Tuning Unit 203    Re-Training Unit 204

Context Information Provider Unit 205    Semantic Searcher 237

Data Collector 207    RAG Unit 206    LLM Grounding Unit 236

Vector Database Constructor 208    Vector Database(s) 209

Report and Proposal Generator 210    Prompt Generator 211

Access Review Policy Manager 212    Access Review UI 215

LLM-Based Trigger Constructor 214    Trigger Configuration Module 213

IAM Integrator 216    Policy Compliance Checker 218

Feedback Loop Database 219    Event Logger 217

Notification and Alert 220    Organizational Structure Analyzer 221

Email Content Analyzer 222    Access Event Monitor 223

Access Decision Executor 224    Permission Scope Evaluator 225

Audit Trail Generator 226    Access Modification Recommender 227

Tenure-Based Trigger Handler 229    Role Change Detector 230

Access Justification Explainer 231    Access Policy Updater 233

Peer Group Constructor / Analyzer 232    NLP Unit 228

Security Compliance Unit 234    Continuous Learning Module 235

System 200

*Fig. 2*

AUTOMATIC PERFORMANCE OF ACCESS REVIEW UTILIZING A LARGE LANGUAGE MODEL (LLM)

FIELD

Some embodiments are related to the field of computerized systems.

BACKGROUND

A large corporation, organization, or other entity may have thousands of team-members who utilize computing devices for various purposes; for example, to send and receive electronic mail, to engage in video calls, to browse the Internet, to compose documents, to access data repositories, or the like. Over time, such organization may accumulate a large "data lake", which may include numerous databases, data silos, documents, files, folders, and data items.

SUMMARY

Some embodiments include systems, devices, and methods for automatically performing an Access Review process, periodically and/or upon demand and/or if one or more triggering conditions hold true; by utilizing a Large Language Model (LLM). The automated and LLM-based or LLM-assisted or LLM-guided Access Review process may examine or review current access permissions and/or access privileges, to particular organizational resources or to groups-of-resources or to a type or types of resources; may check whether the current permissions appear to be suitable, or appear to be at least partially obsolete or incorrect; and may propose and/or perform a modification to current access permissions.

For example, an LLM-based/LLM-assisted/LLM-guided analysis may indicate to a manager (e.g., a group manager, a department manager) that Team-Member 1 has left the organization last week; that Team-Member 2 has moved from the Marketing department to the Accounting department; and that Team-Member 3 was moved from Product-A project to Product-B project; and therefore, the access permissions of those three members should be modified, reduced, or canceled, with regard to a particular organizational resource or with regard to a batch or group or set of organizational resources. The LLM-based/LLM-assisted/LLM-guided analysis may take into account textual input, that was provided by the manager in a natural language (e.g., English, Spanish, or the like), describing which type of users need—or need not—have access to which type of organizational resources, optionally indicating also for which time period, from which locations (e.g., only from the office; only from home; only within the USA and not when travelling), for which purposes, at which scope of permission (e.g., read only; or both read and write; create new file or object; delete existing file or object; modify an existing file or object), and/or other textual data that can facilitate the LLM-based review of access permissions.

Some embodiments may provide a computerized method for automated Access Permissions Review in an organization. The computerized method may comprise: (a) receiving a natural language textual description of an Access Review Policy, that describes in a natural language a plurality of criteria for providing Access Permissions to organizational users towards an Organizational Resource based on a set of characteristics that are defined in a natural language; (b)

constructing a trigger for automatically initiating an Access Review process. The method further comprises: (c) automatically collecting organizational data that pertains to: (i) roles and positions of users in the organization, (ii) user-specific characteristics of one or more of said users, (iii) email messages sent by one or more of said users, (iv) email messages received by one or more of said users, and (v) description of events in which one or more of said users have accessed one or more elements of said Organizational Resource. The method further includes: (d) upon a triggering of said trigger, performing: (d1) providing to a fine-tuned Large Language Model (LLM), at least (I) said Access Review Policy, and (II) augmentation data from said organizational data, and (III) a prompt instructing said fine-tuned LLM to generate a proposal to revoke, modify, add or maintain one or more of the Access Permissions of a particular user, and further instructing said fine-tuned LLM to generate output in said natural language that describes reasoning and supporting evidence for said proposal; (d2) obtaining from said fine-tuned LLM an LLM-generated report that includes said proposal and said reasoning and supporting evidence.

Some embodiments may provide other and/or additional benefits and/or advantages.

BRIEF DESCRIPTION OF THE DRAWINGS

FIG. 2 is a schematic block-diagram illustration of a system, in accordance with some demonstrative embodiments

DETAILED DESCRIPTION OF SOME DEMONSTRATIVE EMBODIMENTS

Figure 1:
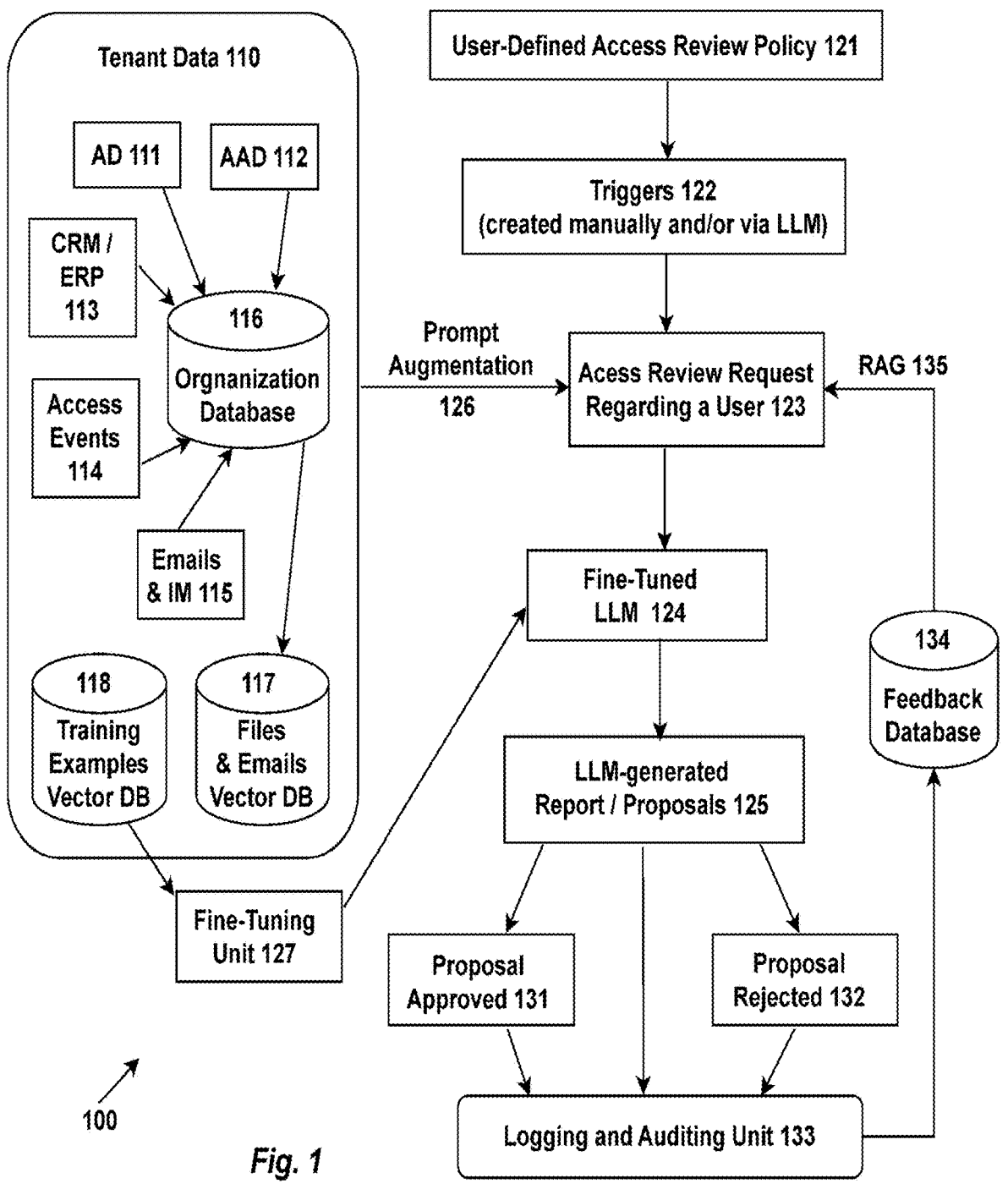
FIG. 1 is a schematic block-diagram illustration of a system, in accordance with some demonstrative embodiments.

The Applicant has realized that an organization may accumulate a large volume of data, data-items, documents, email messages, electronic messages, and information stored in a variety of local and/or remote and/or cloud-based and/or on-premises repositories, databases, folders, drives, physical drives, virtual drives, data silos, Customer Relationship Management (CRM) systems, Supply Chain Management (SCM) systems, Enterprise Resource Planning (ERP) systems, and/or other information sources or data repositories, forming a "data lake" or a similar hybrid/combined/unified data repository.

The Applicant has further realized that not all users of an organization have the same access privileges or access permissions, to the same organizational resource and/or to a group or set or type of organizational resources. For example, realized the Applicant, Manager Mike may grant to 24 particular team-members permissions to access files located in the folder "Project-Tiger"; and similarly, Manager Mike may grant to 27 particular team-members (some of them from belonging to that group of 24 members, and some are not), permissions to access files located in the folder "Project-Spider". Periodically, realized the Applicant, there is a need to review, modify and/or adjust the access permissions; and in conventional implementations, this was done in an entirely manual process that is time-consuming, effort-consuming, and error-prone.

The Applicant realized, for example, that in a monthly Access Review process, Manager Mike may not remember that team-member Adam has left the organization three days ago; or that team-member Becky has moved from the Marketing department to the Accounting department last week; or that team-member Carla has just started her maternity leave; or that team-member David was recently moved from Project Spider to Project Tiger. Therefore, realized the Applicant, a manual Access Review process may often yield incorrect results; such as, maintaining an access permission that should have been revoked or reduced, or granting an access permission to a user that should not have received it, or other incorrect results.

The Applicant has realized that permission-granting system and access control systems or other privileged access systems may require frequent (e.g., monthly, or even weekly) permission access reviews, which in turn can be time-consuming, effort-consuming, and error-prone. For example, realized the Applicant, in a conventional Access Review process, one central person (e.g., often being a busy manager) needs to decide whether or not to maintain a current access permission, to grant a new access permission, to modify an existing access permission, and/or to revoke or limit an existing access permission. The manager may not have all the relevant information at hand; or may find it difficult to track the current positions and changes that pertain to dozens of team-members, some of them reporting to him only indirectly and not directly, and/or some of them located in remote offices.

The Applicant has also realized, innovatively, that a manager or other resource owner should be able to provide at least a high-level textual description in a natural language (e.g., English, Spanish), describing in simple words who should be allowed (or not allowed) to access the resource(s) or type-of-resource; yet such manager or resource owner may encounter difficulties in actually performing the evaluation itself in a correct manner. Furthermore, realized the Applicant, the manual Access Review process may suffer from "decision fatigue", as in some situations the manager or the resource owner prefers to "bulk-approve" many access permission requests without carefully considering them, or prefers to maintain existing access permissions without digging deeper into their correctness or current relevance, since more urgent tasks or more important tasks occupy the manager or the resource manager.

For demonstrative purposes, the term "Resource Owner" as used herein may pertain to such manager or group leader or department manager or project manager, or a person who is the decision-maker with regard to allocating/approving/denying/modifying/revoking Access Permissions or Access Privileges to a particular Resource (e.g., a file, a folder, a digital object, a repository of digital files/objects/assets, a virtual drive, a physical drive, a storage unit, a set or subset of files/folders/repositories/documents, or the like). In some embodiments, the Resource Owner need not necessarily have a managerial position; for example, it can be an assistant or a secretary or an intern of a manager who assists that manager in specific tailoring of access permissions for a particular group of team-members or for a particular project.

Some embodiments may provide one or more solutions or implementations. In a first implementation, the Resource Owner describe, as text that he provides (e.g., authors, composes, writes, dictates) in a natural language (e.g., English, Spanish), who should be (and/or, who should not be) allowed access permissions to a particular Resource (or set of resources); and subsequently, during the Access Review process of those access permissions, the LLM-based system will assist the Resource Owner in evaluating whether the users that currently have access to that resource still meet those conditions or criteria or parameters that the Resource Owner had defined in advance in that textual description, or (conversely) if one or more existing access permissions should be modified/increased/reduced/revoked. In a second implementation, additionally and/or alternatively, the system may utilize Documents Content and/or User Activity to detect that current/existing Access Permissions are stale, or are not up-to-date, or require or even necessitate modification/increase/decrease/revoking of at least one or more access permissions of at least one or more team-members or users; and the system may automatically generate, propose, and explain such modifications to the Resource Owner, for his approval (or rejection).

In a demonstrative computerized method of some embodiments, Data Collection (and/or data extraction) is performed, regularly and/or periodically (e.g., every hour, every day) and/or continuously (e.g., in a continuous manner, via a data collection unit that continuously monitor the creation of new data or files, the addition or removal of team-members, or the like). For example, the following data may be collected regularly: (a) Data from identity providers and CRM/ERP systems, including by scanning of organizational directories and CRM/ERP systems, such as Active Directory (AD), Azure Active Directory (AAD), Okta, Salesforce, Hubspot, Microsoft Dynamics 365, or the like. (b) Data indicating or representing information about all users in the organization, including the user's Organizational Unit (OU) and/or Department (e.g., Marketing, Finance, Legal), user title/position (e.g., Project Manager; CEO; CFO; Junior Developer), user's email address, direct manager(s) information (e.g., Adam reports directly to Bob), indirect or meta-managers information (e.g., Adam also reports indirectly to Carla who is the manager of Bob), and possibly other user-related information that can be extracted or obtained from organizational systems, Human Resources (HR) systems, or other data sources, e.g., when did the user join the organization; how long has the user been working at the organization and/or at the current department or OU; possibly a projected termination date of the employment of the user, in case the user already gave advance notice of resignation or in case the organization gave to the user an advanced notice of termination, data indicating that the user is currently (or will be, or finished being in) in a maternity leave or a paternity leave or a family-based leave or other leave of absence, an indication that the user is currently on a paid or non-paid vacation or time-off that is expected to last N days or at least N days (e.g., a month of vacation), and/or other user-related information that can be extracted and collected; (c) Groups in the organization, and the members of each group (e.g., the Tiger Team is a Sales team in which David and Eve and Frank are members, and they report to the sales manager Gina); (d) an organization chart or structure tree, indicating the information collected above and/or other or additional information (e.g., indicating managers, subordinates, same-level peers or same-tier peers, other-level peers or other-tier peers); (e) Domain Information; (f) peer groups of users, such as, indicating that Adam from Sales often corresponds with Bob for Accounting, even though they are in different departments, since Adam has to request daily from Bon to prepare invoices for sale transactions that Adam made; (g) events log or events data, as the system logs and monitors access/read/write/copy/modification/share/delete operations on files/documents/objects/folders, and/or event logs indicating sharing operations or that a particular item was sent from User A to User B, or that a particular item was received at User C from User D, or that a particular item was shared via a particular channel (e.g., as a link or shortcut, or as an attached file) by User A to Users A and B; and/or other logged events, such as, indicating that user Adam is accessing the "Adam-Sales" folder and the "Adam-Invoices" drive every day; and that Manager Mindy also accesses those same resources as she is the direct supervisor of Adam; and that Finance department's Frank writes new files (new invoices) into the "Adam-Invoices" drive every Monday; and/or logged events indicating that an access permission was added/removed/revoked/modified, with regard to a particular user, at a particular time-and-date, by the Resource Owner or by another entity (e.g., a system administrator); (h) files content, file title/name/meta-data, which are collected and can be embedded in a Vector Database. In some embodiments, the Vector Database is continuously or periodically updated; whereas in other implementations, an alternate approach can be used to embed only relevant files during the Access Review process itself.

The method further comprises defining or creating an Access Review Policy, in a natural language (e.g., English, Spanish, French), in which the Resource Owner described the criteria/conditions for inclusion in and/or exclusion from the set of access permissions for a particular resource (or set of resources). For each resource for which Access Reviews are performed or are planned to be performed, the Resource Owner composes or writes or dictates a textual description indicating who should be allowed to access that resource (e.g., "Senior Developers and Project Managers"); and optionally, who should not be allowed (e.g., "exclude developers with less than 3 months experience in the organization", or "exclude salespeople that sell Product A and do not sell Product B", or "exclude JavaScript developers"). A demonstrative Access Review Policy can be, for example, "This security group is intended for Engineers, that have been working with Databricks in the last 30 days, who are at least Team Leaders". In order to check whether User Adam should or should not belong to this group, the system would need to make several evaluations/investigations/decisions, based on analysis of accumulated data: to determine whether User Adam is an engineer; to determine whether User Adam has been working on Databricks in the last 30 days; to determine whether User Adam is a Team Leader (e.g., has at least one subordinate).

Some embodiments may provide and use triggers or pre-defined conditions, that cause an initiation of an automated or LLM-guided or LLM-assisted Access Review event or process. For example, a Scheduled or Pre-Scheduled triggered may be a periodical/time-based/time-interval trigger, in which the Resource Owner defines that an Access Review would be performed every D days (e.g., every 14 days, every 30 days, on the 4th day of every calendar month). The time-period may be set specifically by the Resource Owner; and/or may be configured or required or set by a system administrator (e.g., the system administrator may configure a requirement that an Access Review for all groups/all permissions would be automatically initiated every 30 days, even if a particular Resource Owner desires to do such review every 60 days). In some embodiments, a time-based trigger may be defined or configured, counting days from the day in which the Access Review Policy was created (or, was most-recently updated or modified); such as, the system may be configured to initiate an Access Review at Day 21 after the creation of a new Access Review Policy. In some embodiments, a User Properties based trigger may initiate an Access Review if one or more user properties are modified/deleted/added; for example, immediately upon detecting a change in the Resource Owner himself (e.g., Manager Janet has quit and Manager Bob replaces her, so an Access Review is immediately triggered by the system to allow the new manager Bob to review/modify the access permissions that were previously set by manager Janet); or upon detecting that a user in a particular group has moved from Department A to Department B, or from one OU to another OU, or from one position/title ("junior developer") to another position/title ("senior developer"); or when the system detects that one or more other user-related properties were modified (e.g., Employee James was modified in the director from being a "full-time employee" to being a "part-time employee" or a "consultant"; or from being an "on-premises employee" to being a "remote employee"). In some embodiments, a Tenure-based Trigger may be defined or configured; for example, the access permissions that were granted to Senior Developer Andrew, who is employed at this organization for 8 years, will be reviewed every 30 days; whereas, the access permissions that were granted to Senior Developer Benjamin, who is a newly-hired employee and who started working at this organization only 6 days ago, will be reviewed every 15 days (e.g., setting a differential Access Review interval for different employees based on their tenure in the organization; with a more-frequent trigger/shorter review interval for recently-hired employees or for employees that are with the companies less than M months). In some embodiments, Event-Based Triggers may be defined or configured, by a particular Resource Manager and/or by a system administrator (e.g., company-wide, department-wide, OU wide); for example, defining a Project Delivery or a Project Completion as a triggering event to perform automated or LLM-guided Access Review, or defining a corporate event (e.g., completion of merger and acquisition transaction) as such Access Review trigger, or defining that a re-organization (re-org) event, in which new positions were introduced and/or previous positions were eliminated or modified, would triggers such Access Review.

Some triggers may be defined or configured on a Per-Group basis, or on a Group by Group basis; or on a Per-User basis; or on a Per Resource Owner basis; or they can be time based, event based, tenure based, organization based, department based, or based on other criteria or parameters or a combination thereof. In some embodiments, cumulative and/or alternate triggers may be defined and enforced; for example, a time-based trigger may be configured to initiate an Access Review every 30 days; however, a user-based trigger may be configured in parallel to initiate an Access Review upon termination of employment of any one or more member(s) of a group/team/department; and the Access Review would be triggered or initiated according to the event that occurs first. For example, a trigger can be created for an Access Review Policy (e.g., all users with access permissions will be reviewed), and/or for a particular user (e.g., due to his short tenure, or due to her junior position or title), and/or due to organizational changes or external events, and/or other suitable criteria or conditions.

In some embodiments, the system may include a User Interface to define or set or modify or configure such triggers; or, in some implementations, the system may create such triggers based on LLM-analysis of a textual description that the Resource Owner provides in the Access Review Policy or in conjunction with it; e.g., by including the phrase "I would like this Access Review Policy to be re-checked every month" in the Access Review Policy or in another field or record that pertains to it, which the system may then translate into creation of an automated trigger every 30 days, or on the first day of every calendar month.

Once a pre-defined trigger is indeed triggered, an automatic LLM-guided Access Review process is initiated; for each Resource Manager to which that trigger pertains, and/or for each User in the organization to which that trigger pertains. The Access Review is performed by, or guided by, a fine-tuned LLM that operates based on the relevant Access Review Policy.

For example, a prompt generator unit may dynamically construct a prompt or a query to the fine-tuned LLM, comprising the following data: (a) description of the Resource Owner; (b) description of the Trigger that was triggered and initiated the Access Review, with the relevant data; such as, "User Adam has moved today from the Sales department to the Marketing department", or "User Bob has submitted yesterday his letter of resignation"; (c) organizational data about each user that is subject to the Access Review, as extracted and collected by the system (e.g., as previously extracted and collected by the system in a continuous or periodical manner, or as currently obtained/freshly extracted by the system immediately upon the initiation of the trigger); (d) data about the relevant user's manager(s), subordinate(s), peer(s), peer groups; (e) additional data that is provided or generated by a Retrieval Augmented Generation (RAG) unit, such as email messages or instant messages that were sent and/or received by the relevant user/s in the past N days and/or with regard to Subject X or with regard to Project Y, and/or files/documents/objects that were accessed/created/read/modified by the relevant user/s in the past N days and/or with regard to Subject X or with regard to Project Y. Optionally, the prompt to the fine-tuned LLM may further be augmented or enriched, for example, with feedback that was provided by one or more users/Resource Owners in response to previous/historic/past Access Review proposals.

In response to the prompt and the augmenting/enriching data, the fine-tuned LLM generates an output in the form of a Proposal for Permission Access Modifications, or a Report for Assisting in Permission Access Review. Such proposal or report may include multiple sections or information items, for example: (a) actions or modifications that the LLM proposes or suggest to do (e.g., "The system suggests that you give Permission A to User B, and that you give Permission C to Users D and E"; or "The system suggests that you revoke Permission A from User B"; or optionally, negative proposals describing which actions to avoid, such as, "The system suggests that you do not make any changes to the existing Permissions of User F"); (b) optionally, a Confidence Score or a confidence level (e.g., in a scale of 0 to 100, where a higher score indicates a higher level of certainty of the system in the validity/correctness/efficiency of its proposal); (c) importantly, a Textual Justification/Textual Reasoning component, in which the report/the proposal explains in a natural language what is the reason or justification for each proposed action (e.g., "A senior developer typically requires Permission A, whereas a junior develop does not"); (d) Supporting Evidence or information/facts that support each proposal or suggestion (e.g., "The proposal to add Permission A to User Bob derives from the fact that User B was promoted yesterday from Junior Developer to Senior Developer"; or "The proposal to revoke the permission of User Adam to read documents in Folder F derives from the fact that User Adam moved last week from the Marketing department to the Sales department, and also because Project Tiger has been completed three days ago"). For example, the Supporting Evidence may help to increase the reliability of the system, and to enable the Access Reviewer/the Resource Owner to examine such Supporting Evidence, to prevent or avoid or cure rare instances of LLM-based "hallucination" errors that might occur, and/or enabling to assign a different meaning or a different weight to text/s or data that the LLM reviewed and analyzed, thereby increasing the system's accuracy and preventing mistakes; for example, the Supporting Evidence might show that the LLM proposed to revoke the access permission of User Carla, based on an email that User David sent her in which he wrote, "Please just send me the final results and then you're done, see you Monday", the LLM might have deduced from that email message that User Carla is "done with the entire project" and therefore proposed to remove her access permission, whereas the Resource Owner can review that email message in the Supporting Evidence and can decide that User David only meant that User Carla was "done for the week" and that User Carla should still continue to have her current access permission.

The LLM-generated report or proposal is sent automatically to the relevant Resource Owner; and optionally also to other pre-defined recipient(s), for example, a human approver or decision-maker, an auditing/logging unit, a system administrator, a manager of the Resource Owner. Optionally, the LLM-generated report or proposal may include integrated links or hyperlinks or other shortcuts, that enable the Resource Owner or the decision-maker to selectively "approve" or "reject" each particular recommendation/suggestion in the report, or to approve reject some of them or all of them in bulk, or a mechanism to over-ride a particular proposal and to replace it with a different action or modification. Optionally, each particular recommendation in the report, and/or the entire LLM-generated report, may also be accompanies by a Feedback Loop mechanism that enables the Resource Owner to provide feedback, indicating whether a particular LLM-generated recommendation was indeed correct and useful and accepted, or conversely was incorrect and/or was rejected and/or was modified by the human reviewer; Optionally, such feedback may be ingested into an additional/dedicated Vector Database, and can be used by the fine-tuned LLM and/or by the RAG unit in subsequent iterations or in subsequent automated Access Review events. For example, Resource Owner Adam may repeatedly reject the LLM-based proposals, to revoke a particular permission from Sales people who moved to become Marketing people; and after one, or several, such rejections, the system may learn that such proposal is incorrect in general, or is not acceptable to this particular Resource Owner, or is not acceptable in a particular set of facts or conditions; and subsequent LLM-generated proposals may reflect such user-provided feedback to previous proposals.

Some embodiments use a fine-tuned LLM to generate the Access Review report or proposal, as such LLM can be a useful component in the Access Review process, and can provide one or more benefits that can enhance the effectiveness and efficiency of such process. For example, the fine-tuned LLM may provide one or more, or some, or most, or all, of the following benefits or advantages: (A) Analysis of large volume of data; (B) Automated analysis that is not subject to human fatigue or human attention span; (C) Fast processing time, providing immediate or real-time or near-real-time output; (D) Ability to recognize patterns within data; (E) Capabilities of Natural Language Processing (NLP), as well as analysis of text, numerical data, email messages, corporate documents, and a variety of types of data; (F) Capability to generate action items and actionable insights from large amounts of raw data; (G) Contextual understanding, that can take into account nuances of certain terms in a particular context; (H) Data correlation, as the LLM may correlate among multiple data-items from multiple sources; (I) Trend detection and trend analysis; (J) Scalability, allowing the LLM to rapidly process information from multiple sources about a group of dozens—or even hundreds—of users, and to generate relevant and tailored proposals to modify the Access Permissions of particular individuals within that group; (K) Utilization of a feedback loop that enables the LLM to take into account the human responses to past proposals, in which humans had indicated the level of accuracy/relevance/correctness of such previous proposals, thus enabling continuous learning by the LLM tool in order to improve subsequent proposals; (L) Enabling the Resource Owner to rapidly reach an informed decision, as the human decision-maker receives a concise report with textual recommendations and their reasoning and their supporting evidence; (M) Multi-lingual support, as the LLM can process information in several natural languages; (N) Cost reduction, as employing the LLM to rapidly review and analyze a vast amount of organizational data can save hours of human efforts, thereby saving human time as well as costs of human labor and the risks of decision fatigue.

Some embodiments may utilize a Fine-Tuned LLM that was particularly configured to specialize in tasks of reviewing Access Permissions of users based on a given Access Permissions Policy and based on organizational context information. The LLM can be, for example, Llama-3, Mistral, or other suitable LLM, which can be trained on the relevant domain knowledge. In the fine-tuning process, the model's weights, which had been pre-trained on a vast corpus of general data, are further adjusted to perform particularly well on a specific task or domain based on a dataset that is enriched and labeled for this particular task. The dataset format for fine-tuning dataset can be in the generic schema of [{prompt: "< >", completion: "< >"}, { . . . }, . . . ]. In some implementations, the prompts and completions contain a large set of examples in which each prompt represents a textual rule, and the completion represents the expected "perfect" result or output that should be returned.

The fine-tuning of the LLM may provide several benefits or advantages, for example: (A) Specialization: while pre-trained language models have a broad understanding of language, they may not be optimized for specific jargon, styles, or nuanced expression used in particular domains (e.g., legal, medical, technical, and in this case Access Review processes). (B) Improved Performance: fine-tuning allows the model to adapt its parameters to the specifics of a dataset, which can lead to better performance metrics (such as accuracy, F1 score) on the desired task. (C) Task-Specific Knowledge: tasks like question-answering, summarization, or sentiment analysis may require the model to learn patterns that were not the focus of its initial pre-training. (D) Data Efficiency: Fine-tuning can often achieve improved results with relatively small amounts of task-specific data, leveraging the knowledge already encoded in the model during pre-training. (E) Addressing or mitigating Data Bias: Pre-trained models can inherit biases from their training data; fine-tuning on a more balanced or curated dataset can help mitigate these biases.

The fine-tuning process of the LLM may include multiple steps; for example: (a) Initialization: the model starts with weights that have been learned during its pre-training phase; (b) Further Training: the model is fine-tuned using a task-specific dataset, that is much smaller than the one used for pre-training, and contains examples of the particular task that the model needs to perform, by providing pairs of example input and expected (correct, perfect, optimal) example output; (c) Parameter Adjustment: During fine-tuning, the model's parameters (weights and biases) are updated to minimize the loss function specific to the task, typically by using gradient descent and back-propagation; (d) Learning Rate: a lower learning rate is used in the fine-tuning, compared to the initial pre-training phase, to make smaller adjustments to the weights and avoid over-writing the pre-existing knowledge encoded in the model; thus ensuring that the model does not "forget" the initial information it was trained on but will learn the new capabilities; (e) Regularization: techniques like early stopping or dropout may be used to prevent over-fitting to the fine-tuning dataset, ensuring that the model retains its generalizability; (f) Freezing Layers: Sometimes, only a portion of the model's layers are fine-tuned while others are "frozen"; the last few layers are fine-tuned because they are more task-specific, while earlier layers capture general language features; (g) The fine-tuning is a balancing act between retaining the vast knowledge that the model had already gained during pre-training and adapting it sufficiently to excel at a specific task, with the end goal to have a model that can understand and generate text in a way that is tailored to the requirements of the particular application.

Some embodiments are thus configured to perform fine-tuning of the LLM to make it specifically suited for the task of automated Access Review guidance. For example, a set of documents (e.g., dozens, or even hundreds of documents) are prepared for the fine-tuning process, to be embedded in a Vector Database. Each of those exemplary dataset items contains: (a) a given Access Review Policy, and (b) the correct/expected/accurate/optimal Access Review decision (or proposal, or suggestions), and (c) the reasoning/justification/supporting evidence for that Access Review decision. The dataset of "correct examples" is then used for fine-tuning the LLM. The following reports are demonstrative examples that can be supplied to the fine-tuning unit that performs the LLM fine-tuning.

The following is a first demonstrative example of an LLM-guided/LLM-based/LLM-generated report, that can be generated by utilizing the fine-tuned LLM, in order to guide a permissions access reviewer/decision-maker with regard to maintaining, revoking, adding and/or modifying one or more access permissions of a first particular team-member. It demonstrates a proposal to maintain un-changed the current access permissions of this team-member.

(A) Access Review Policy (or, the textual description as defined by the resource owner): The resource owner had specified that access permissions to the files of this project should be granted to users who are part of the "Project Tiger" team, and have been in the organization for more than one year, and have had recent email correspondence about the status of "Project Tiger".

(B) Trigger Type: Periodic (e.g., automatically every 30 days).

(C) User Data: The particular team-member under review is Adam Brown; he is a Software Engineer, he has been with the organization for two years, and his direct manager is Janet Smith.

(D) Email Data: The analysis shows that Adam Brown has sent 4 emails in the past month with the subject containing the phrase "Project Tiger—weekly status". An analysis of the body of these email messages indicates that they discuss tasks related to "Project Tiger", and that they mention one or more action items that are assigned to Adam Brown in this project.

(E) File Access Data: The analysis shows that Adam Brown has accessed six files related to "Project Tiger" in the past month; for example, he accessed four times the file "Project Tiger Objectives. docx", and he accessed two times the file "Project Tiger Progress. xlsx".

(F) Based on the collected and analyzed information, some of which is demonstrated above, the system recommends to the Access Reviewer to maintain the current access permissions of Adam Brown to the resource(s); and here are the top five reasons that support this proposal: (a) Adam's role as a Software Engineer is relevant to this project; (b) Adam has sent multiple emails discussing "Project Tiger"; (c) The content of Adam's emails is directly related to tasks within "Project Tiger"; (d) Adam has actively accessed several files related to "Project Tiger"; (e) The frequency of his access indicates ongoing involvement with "Project Tiger".

(G) Optionally, the generated report may further include links or hyperlinks or clickable/selectable elements, or shortcuts to actions, that enable the decision-maker/the Access Reviewer to efficiently "approve" or "reject" or "modify" the LLM-generated proposal.

The following is a first demonstrative example of an LLM-guided/LLM-based/LLM-generated report, that can be generated by utilizing the fine-tuned LLM, in order to guide a permissions access reviewer/decision-maker with regard to maintaining, revoking, adding and/or modifying one or more access permissions of a second particular team-member. It demonstrates a proposal to revoke or remove or cancel an access permission of this team-member.

(A) Access Review Policy (textual description from the Resource Owner): The resource owner had specified that access to the project files should be granted to users who are part of the "Project Yellow" team, and have been in the organization for more than a year, and have had recent email correspondence about the status of "Project Yellow".

(B) Trigger Type: upon change in the User's Department. Previous department was: Engineering; New department is: Product Management.

(C) User Data: The user, Becky Gold, is a product manager; she has been with the organization for 2 years; she has been in her current position for one day.

(D) Email Data: Becky has sent 4 emails in the past month with the subject containing "Project Yellow updates". In a recent email message, Becky was informed that she is being transferred to a different department, and had an action item assigned to her to perform a knowledge transfer and handover to David.

(E) File Access Data: Becky has accessed several five related to "Project Yellow" in the past month.

(F) Based on this information, the LLM-generated report proposes to revoke the permission of Becky to access this resource; and generates and conveys these top reasons that support the proposal: (a) Becky's role has changed from a Software Engineer to a Product Manager; (b) According to an analysis of a recent email that Becky received, she will no longer work on "Project Yellow".

(G) Optionally, the generated report may further include links or hyperlinks or clickable/selectable elements, or shortcuts to actions, that enable the decision-maker/the Access Reviewer to efficiently "approve" or "reject" or "modify" the LLM-generated proposal.

The above are only non-limiting examples, and other types of proposals may be generated by the LLM-based analysis. For example, an LLM-generated report may propose to revoke a first particular access privileged of User Adam, and to maintain a second particular access privilege of User Adam; and/or, to revoke first particular access privileged of User Bob, and to create or introduce a second, newly-added, particular access privilege for User Bob; and/ or, to maintain one or more access privileges of User Carla, and to modify (e.g., from read-and-write access, to read-only access) one or more access privileges of User Carla, and to revoke one or more access privileges of User Carla, and to add one or more new access privileges of User Carla. Other suitable combinations may be generated and proposed.

The system may utilize a Feedback Loop in order to learn from past iterations and to improve the accuracy of subsequent iterations. In a demonstrative example, the Resource Owner has defined an Access Review Policy that enables a group of team-members to access a sensitive Sales Dashboard. The current permissions were granted to: Adam (Senior Sales); Becky (Junior Sales); Carl (Junior Sales); David (V.P. Sales). In a first iteration of the Access Review, held on September 1, the LLM-based system analyzes the natural language description, the current permissions, and the collected/extracted information and organizational context; and generates a proposal to revoke the access permissions of Becky and Carl. In response, the Resource Owner accepts the proposal to revoke the access permission of Carl, but rejects the proposal to revoke the access permission of Becky; and provides the following feedback: "Becky is leading the project of the Sales Dashboard". The next iteration is performed automatically on October 1, and in that subsequent iteration, the LLM-based system knows that Becky is relevant/crucial to this project, and absent new factors/new information, the October 1 report does not propose to revoke the access permissions of Becky.

Reference is made to FIG. 1, which is a schematic block-diagram illustration of a system 100, in accordance with some embodiments, System 100 may be constructed to perform a method of automated or semi-automated or LLM-guided or LLM-assisted Access Review, using suitable hardware components and/or software components.

As demonstrated in Tenant Data 110, a plurality of information sources may be used, scanned, crawled, and/or otherwise reviewed or analyzed automatically by a data collector/extractor unit. For example, information can be obtained or extracted or collected from Active Director (AD) 111, from Azure Active Directory (AAD) 112, from CRM/EPR systems, from a log of Access Events 114, from email messages and IM messages 115, and/or from other sources; for constructing and also updating an Organization Database 116. In some embodiments, a Files & Emails Vector Database 117 is constructed; and optionally, a Vector Database of Training Examples 118 may be used by a Fine-Tuning Unit 127 to fine-tune an LLM 124.

A user-defined Access Review Policy 121 is the main input that the Resource Owner (or the access reviewer) defines and that is later provided as input to the fine-tuned LLM 124. One or more Triggers 122 are created, manually and/or automatically by the LLM (e.g., based on LLM review of the Access Review Policy). The triggers may initiate (and/or the Resource Owner or another authorized user may initiate) an Access Review Request 123, with regard to a particular resource/user/group of users. Prompt Augmentation 126 is performed based on the insights and data collected/extracted from the Tenant Data 110, and optionally also based on RAG information 135 from a feedback loop as indicated by Feedback Database 134; and the Fine-Tuned LLM 124 outputs an LLM-generated Report/Proposals 125 with regard to the Access Review that is being requested or that was triggered. The LLM-generated proposal(s) can be approved (block 131) or rejected (block 132); and a Logging and Auditing Unit 133 monitors and collects the data with regard to the content of the LLM-generated proposal and with regard to the approval/rejection of each proposal; and such data then populates the Feedback Database 134, to improve subsequent iterations of access review events by continuous learning via RAG 135.

Reference is made to FIG. 2, which is a schematic block-diagram illustration of a system 200, in accordance with some embodiments, System 200 may be constructed to perform a method of automated or semi-automated or LLM-guided or LLM-assisted Access Review, using suitable hardware components and/or software components.

The system may comprise a Fine-Tuned LLM 201, which can be a specialized Large Language Model that was trained on access review tasks, optimized to analyze organizational data, generate permission proposals, and provide reasoning and justification based on predefined policies. Additionally or alternatively, optionally, a corpus of knowledge or a Dataset of Training Examples 202 (e.g., hundreds or even thousands of training examples) can be provided to the fine-tuned LLM, or in some implementations to a general LLM that can accepts millions of tokens as context or as input. In some embodiments, the Dataset of Training Examples 202 can be utilized to fine-tune or re-train the LLM, by a Fine-Tuning Unit 203 or by a Re-Training Unit 204; and/or, in some implementations, the Dataset of Training Examples 202 can be provided to the LLM directly as additional context or as enriching/augmenting information, via a Context Information Provider Unit 205 or by a RAG Unit 206.

The system includes a Data Collector 207, configured to obtain and collect relevant data from organizational directories, AD, AAD, CRM systems, ERP systems, email systems, logs, file access logs, peer and peer-groups data, and/or other data sources to compile necessary information for access review processes.

A Vector Database Constructor 208 is configured to construct and/or to periodically update one or more Vector Database(s) 209, that store embedded representations of organizational data and organizational context, including (or based on) text, email messages, Instant Messaging (IM) messages, access logs, and other sources; thereby facilitating efficient retrieval and analysis during the actual LLM-assisted review process. The above-mentioned Retrieval-Augmented Generation (RAG) Unit is configured to enhances LLM outputs by integrating real-time data retrieval, enriching the generated proposals with up-to-date contextual information to support access review decisions.

A Report and Proposal Generator 210 compiles LLM outputs into comprehensive reports and proposals that include suggested access changes, supporting evidence, and textual justifications for decision-makers.

A Prompt Generator 211 is optionally included and is configured to create tailored prompts for the Fine-Tuned LLM using data collected from organizational contexts and access review policies, ensuring accurate and relevant responses from the LLM.

An Access Review Policy Manager 212 is a unit that enables Resource Owners to define, update, and manage access review policies in natural language, specifying criteria for access permissions based on roles, tenure, and other conditions.

A Trigger Configuration Module 213 is operable to configures and manages triggers (e.g., time-based, event-based, user-based) that initiate automated access review processes, ensuring timely and relevant evaluations of permissions. Optionally, an LLM-Based Trigger Constructor 214 may utilize the fine-tuned LLM (or another LLM that was specifically fine-tuned or trained for this purpose) to generate or to define Triggers, based on LLM analysis of the Access Review Policy.

An Access Review User Interface (UI) Unit 215 provides a UI or a Graphical UI for Resource Owners and administrators to interact with the system, configure policies, view reports, and approve or reject proposed access changes.

Optionally, an Identity and Access Management (IAM) Integrator Unit 216 may integrate with one or more IAM systems, such as AD or AAD or Okta, to extract user roles, access logs, and other identity-related data that can be useful for LLM-guided access reviews.

An Event Logger 217 monitors and logs events related to access activities, changes in user roles, and other organizational actions that could impact access permissions. Optionally, a Policy Compliance Checker 218 may assess current access permissions against defined access review policies, identifying discrepancies, outdated permissions, or unauthorized access for further review.

A Feedback Loop Database 219 stores feedback from Resource Owners on LLM-generated proposals, allowing the system to refine its suggestions and improve accuracy in subsequent reviews. A Notification and Alert Unit 220 notifies Resource Owners, managers, or other stakeholders of pending access reviews, policy updates, or critical access changes requiring immediate attention.

An Organizational Structure Analyzer 221 analyzes and optionally also visualizes the hierarchy, roles, and relationships within the organization to inform access decisions based on user positions and reporting lines. An Email Content Analyzer 222 extracts and analyzes email content to determine user involvement in projects, identifying access needs based on communication patterns and project engagement. An Access Event Monitor 223 tracks user interactions with resources, such as file accesses and modifications, to determine the relevance of current permissions based on activity patterns.

Optionally, an Access Decision Executor Unit 224 implements approved changes to access permissions automatically, updating IAM systems to align with the decisions made during the review process.

Optionally, a Permission Scope Evaluator 225 may assess the scope of current permissions (read, write, modify, delete) to ensure they align with user roles and access policies, suggesting modifications as needed.

An Audit Trail Generator 226 or a logging and auditing unit may create detailed audit trails of all access review processes, including data collected, proposals generated, and decisions made, ensuring compliance and transparency.

An Access Modification Recommender 227 may be configured to suggests specific modifications to user permissions based on role changes, tenure, and other relevant factors identified during the access review, as reflected in the LLM-generated report or proposal. Optionally, it may break down a long LLM-generated report or proposal, to individual or fine-grained proposals or action items, and may present them individually to the Resource Owner on a per-user basis, on a per-project basis, on a per-position/per-role/per-title basis, or based on other criteria.

A Natural Language Processing (NLP) Unit 228 may be part of the LLM or may accompany the LLM; it processes and interprets natural language inputs from Resource Owners, converting them into actionable data for the access review system.

A Tenure-Based Trigger Handler 229 can manage access reviews based on user tenure, triggering more frequent evaluations for newer or transitioning employees to ensure up-to-date permissions. It may have access to Human Resources (HR) data, particularly to date of hiring of employees or team-members, as well as to other tenure related events or employment related events (e.g., termination, resignation, maternity leave, paternity leave, sick leave, medical leave, vacation, leave of absence, paid vacation, unpaid vacation).

Optionally, a Role Change Detector 230 may identifies changes in user roles/positions/titles, and/or in departments and organizational units within the organization, triggering access reviews when significant role transitions occur.

An Access Justification Explainer 231 may provide LLM-based, clear, natural language explanations for each access recommendation, detailing the rationale behind proposed permission changes. Optionally, a Historical Access Data Analyzer 232 may analyze past access events to identify trends and patterns, using historical data to inform current access review decisions.

A Peer Group Constructor/Analyzer 232 may identify user relationships and peer groups within the organization, ensuring access decisions consider collaborative needs and inter-departmental interactions.

Optionally, an Access Policy Updater 233 may periodically or continuously update the Access Policies based on feedback, new organizational changes, or evolving security requirements to maintain relevant and effective permissions.

Optionally, a Security Compliance Unit 234 may be configured to monitor and ensure that all access decisions adhere to organizational security standards, regulatory requirements, and industry best practices.

Optionally, a Continuous Learning Module 235 is configured to adapts the Fine-Tuned LLM using ongoing feedback and performance data, improving the model's accuracy and effectiveness in making access review recommendations.

Some embodiments provide an innovative system designed to automate the process of Access Review within large organizations, leveraging the capabilities of a fine-tuned Large Language Model (LLM). As organizations grow, they accumulate vast amounts of data across various platforms, including databases, documents, files, and other digital resources. Managing access permissions to these resources becomes increasingly complex, especially when considering the frequent role changes, department transfers, and employee exits. Traditionally, access reviews are conducted manually, which is time-consuming, prone to errors, and often results in outdated or incorrect permissions being maintained. Some embodiments are configured to address these challenges by automating the review process, improving accuracy, efficiency, and security.

Some embodiments automate or semi-automate access reviews by integrating a fine-tuned LLM that assists or guides the evaluation of current access permissions for users within an organization. This system continuously or periodically analyzes user data, roles, access logs, and other relevant information to determine whether the current access permissions are appropriate. The LLM assesses whether access permissions should be maintained, modified, or revoked, based on predefined access review policies that are expressed in natural language. These policies, defined by resource owners (such as managers or department heads), specify criteria for granting or restricting access based on user roles, tenure, project involvement, prior or recent access to files and folders, and other factors.

The process begins with the Data Collector, which gathers data from various organizational systems, including Active Directory, Customer Relationship Management (CRM) systems, Enterprise Resource Planning (ERP) systems, email logs, and more. This data is then processed and stored in Vector Databases, which are designed to efficiently manage and retrieve embedded representations of the collected information. A Prompt Generator Unit uses this data to create standard or tailored prompts for the LLM, ensuring that the model's analysis is relevant and aligned with the access review policy.

Upon initiation of an access review, the system utilizes a combination of predefined triggers, such as time-based, event-based, or user-specific triggers, to determine when a review should be conducted. For instance, a time-based trigger might schedule reviews every 30 days, while an event-based trigger could initiate a review when an employee's role changes or when a project is completed. These triggers are managed by a Trigger Configuration Module, which allows customization to fit organizational needs. Optionally, one or more of the triggers may be constructed by the LLM itself, based on its review and its analysis of the Access Review Policy and the criteria or conditions that it conveys in a natural language that the LLM can process.

The LLM that the system utilizes can be a locally-installed or locally-running LLM; or may be a remote or a server-side LLM, or a cloud-computing based LLM that is accessible over the Internet or over a communication network; or a combination of local unit(s) and remote unit(s); or a cascade or array or group of two or more LLMs, optionally with one or more control units or master LLM to divide tasks and to aggregate outputs.

Once triggered, the LLM analyzes the collected data using advanced natural language processing that an LLM performs, typically using its decoded-only transformer-based architecture. It reviews user activity, role changes, organizational chart/directory, email interactions, peer group information and relations, file and folder access events, and other historical access events, in order to determine whether current permissions align with the access review policy. For example, if an employee has recently transferred departments, the LLM can identify this change and recommend adjusting the employee's access permissions to reflect their new role.

The LLM-based Report and Proposal Generator compiles the LLM's findings into a comprehensive report, which includes specific recommendations for modifying, revoking, or maintaining access permissions for a specific user/project/resource. Each recommendation is accompanied by a detailed justification, explaining why a particular action is proposed. For instance, the LLM may suggest revoking a user's access to sensitive files if it detects that the user is no longer involved in the relevant project, or it may recommend maintaining access if the user is actively engaged based on their email activity and access logs. In some embodiments, optionally, the system may include, or may be operably associated with, or may operate in conjunction with, an LLM Grounding Unit 236 or an LLM Grounding Module, or an LLM extension/plug-in/add-on that handles or enforces LLM Grounding Rules or an LLM Grounding Policy, such as based on a pre-defined LLM grounding policy or based on pre-defined LLM grounding rules (e.g., limiting the sources or types of information that the LLM can access and/or that can be used to prepare inputs to the LLM, and/or limiting the types of information that the LLM is authorized to include in its outputs); to ensure that the output generated by the LLM is grounded by (constrained by, limited by) data that was inputted by the prompt generator and/or data that the LLM is authorized to access for the purpose of its analysis; in order to reduce or prevent "hallucination" errors by the LLM, and/or in order to ensure that the LLM is accessing only permitted data/permissible data and not other sources of information which may not be reliable and/or which may include sensitive information or confidential information; and/or to enforce other goals in line with the principles of safe and responsible Artificial Intelligence (AI).

The system's Access Justification Explainer ensures that these proposals are transparent, providing clear reasoning that decision-makers can easily understand. This reduces the workload on resource owners, who would otherwise need to manually assess each user's access needs; and this ensures that decisions are based on comprehensive and up-to-date information.

The system is configured to learn and improve over time. The Feedback Loop Database collects feedback from resource owners and decision-makers on the accuracy and relevance of the LLM-generated proposals. The feedback is then used to refine the LLM's future recommendations, via re-training and/or as new context information and/or via RAG enrichment of prompts or context, thereby creating a continuous learning cycle that enhances the system's performance. For example, if a resource owner repeatedly rejects a particular type of proposal, the system learns to adjust its analysis to better align with this owner's preferences and the specific context of the organization. The Continuous Learning Module integrates this feedback into the LLM's training, ensuring that the model remains adaptable and improves with each iteration. This ongoing refinement helps maintain high levels of accuracy and relevance, making the access review process more effective and reducing the risk of decision fatigue among managers.

The system may provide various advantages, including increased efficiency, improved security, and reduced human error. By automating access reviews, organizations can ensure that access permissions are always current, minimizing the risk of unauthorized access or data breaches. The system's scalability allows it to efficiently handle reviews for hundreds or even thousands of users, providing timely and tailored recommendations that keep up with the dynamic nature of modern workplaces.

Moreover, the use of an LLM enables the system to process and analyze vast amounts of data quickly, identifying patterns and correlations that might be missed by human reviewers. The system streamlines the access review process, and empowers resource owners with actionable insights, helping them make informed decisions that enhance organizational security and compliance. The system may thus improve the access review process by leveraging advanced AI capabilities to automate, optimize, and continually improve access management within large organizations. It is also noted that in some embodiments and/or in a variety of situations, the LLM can have access to a Context or to a RAG enhanced prompt, that reflect data extracted from a variety of information sources that a human Resource Owner cannot access or is not authorized to access, or that reflect Context obtained from a large volume of information and messages that the Resource Owner cannot efficiently/rapidly/realistically review or read or evaluate in order to obtain a correct Access Review decision. For example, the context or the RAG-enhanced prompt that is provided to the LLM can be based on thousands of email messages that were exchanged by some (and not necessarily by all) users that belong to a particular team or project or Organizational Unit or Department, and can thus reflect valuable insights that the Resource Owner does not know or cannot efficiently obtain. In a demonstrative example, the Resource Owner Robert is performing an Access Review of the access permissions of 25 users that belong to Project Tiger; these team-members have exchanged among them 1,600 email messages in the past 30 days with regard to Project Tiger; Resource Owner Robert was in the CC field of only 900 of those email messages; Resource Owner Robert would have to invest many hours to review those 900 email messages, and also, Resource Owner Robert has never even read or received the other 700 email messages to which he was not a party. Accordingly, the LLM—and not the Resource Owner—may have a significantly larger picture of the true facts that can be derived from email messages about this project and that the data gathering and collecting modules can obtain and can feed to the LLM as context or as a RAG-enhanced prompt. For example, Resource Owner Robert did not receive the email message, and is not even aware of that email message, in which User Adam wrote to User Bob, "Attached is my final feedback, and this concludes my work on Project Tiger, and I will not have time to work on Project Tiger in the next three months"; and therefore, Resource Owner Robert is now aware of the need to remove/revoke the Access Permissions of User Adam towards the resource(s) associated with Project Tiger; whereas, the LLM can be fed context or a RAG enhanced prompt, that may reflect a correct insight from this email message and/or from other email messages, and such context or prompt can reflect the insight (and can then base the LLM-generated proposal) that the Access Permissions of User Adam should be revoked/removed. It is clarified that in accordance with some embodiments, the Fine-Tuned LLM does not directly access email messages, and does not directly analyze hundreds or thousands of email messages; as the LLM Context window is typically bound or limited by a pre-defined number of tokens, and/or since a direct LLM analysis of thousands of email messages can be costly and/or can cause performance degradation in cost of accuracy and/or time. Rather, email messages are obtained and retrieved, and corresponding embeddings are stored in a Vector Database; and prior to calling (prompting) the LLM, the system performs a Semantic Search on the Vector Database (e.g., using Semantic Searcher 237) to retrieve particular email messages that are related in context to performing the access review; and the prompt constructor unit augments the prompt (using RAG) with the relevant email messages.

Some embodiments may provide some, or all, of the following innovative features. (1) Automated or semi-automated, LLM-guided, Access Review Process; eliminating or reducing the need for manual seeking and then evaluations of intricate details about team-members, by using a fine-tuned LLM to analyze access permissions, ensuring that organizational data is protected and that permissions are up-to-date, significantly reducing the time and effort traditionally required for these reviews. (2) Natural Language Policy Definitions, as Resource Owners can define access review policies in natural language, specifying who should or should not have access based on criteria like roles, tenure, and project involvement; providing a user-friendly approach that removes the need for complex technical configurations, making the access review process accessible to non-technical managers while maintaining precision and adaptability. (3) Trigger-Based Initiation, as the system uses various triggers (e.g., time-based, event-based, user-specific) to automatically initiate access reviews; the triggers ensure that reviews are timely and relevant, responding dynamically to changes such as role transitions, department transfers, or project completions, keeping permissions aligned with current organizational needs. (4) Feedback Loop for Continuous Learning; the feedback loop collects input from Resource Owners on the LLM-generated recommendations, allowing the system to learn from past decisions; the continuous learning mechanism refines the LLM's proposals, enhancing accuracy and ensuring the system adapts to specific organizational preferences and evolving security requirements. (5) Adaptive LLM Analysis, based on the context provided by the collected data, such as recent emails, user roles, and file/folder/resource access patterns and access history; this adaptability allows the LLM to generate tailored recommendations that reflect the unique conditions of each review, improving decision-making with contextual insights. (6) Detailed Justification and Transparency, as each access recommendation is accompanied by a detailed justification that explains the reasoning behind the proposal and/or provides the supporting evidence; this transparency helps Resource Owners and managers understand the basis for each suggestion, increasing confidence in the automated review process and facilitating more informed decision-making. (7) Scalable System Architecture, as the system can handle reviews for hundreds or even thousands of users across an organization; the scalable architecture can process large volumes of data quickly, making it suitable for enterprises of any size, from small teams to global corporations with complex access management needs. (8) Role Change Detection, as the system can be configured to automatically detects changes in user roles, departments, or project assignments, thereby triggering relevant access reviews when significant/relevant transitions occur; ensuring that access permissions are consistently aligned with a user's current responsibilities, and minimizing the risk of outdated or unauthorized access. (9) Integrated Compliance Monitoring, as the system may include compliance checks to ensure that all access decisions adhere to organizational security standards, regulatory requirements, and industry best practices; with integrated monitoring that can help maintain legal and procedural compliance, reducing the risk of data breaches or violations. (10) Permission Scope Evaluation, as the system may evaluate the scope of current permissions (e.g., read, write, modify, delete) and can actively suggest adjustments based on role and access policy; with a granular assessment that ensures that users only have the necessary level of access, enhancing security by limiting or the granting of permissions that are not actually needed. (11) Comprehensive Data Collection and Analysis, as the system can collect data from multiple organizational sources, including AD, AAD, CRM systems, ERP systems, email systems, IM systems, peer group management systems, and other sources; thereby compiling a holistic view of user activities and access needs, as the comprehensive data collection enables more accurate evaluations of permissions, ensuring that decisions are based on complete and current information. (12) User-Friendly interface and interactions, allowing managers to define and configure policies, view access review reports, and approve or reject proposals with ease and by using natural language rather than a programming language; with an intuitive design that streamlines the interaction between human decision-makers and the automated system, facilitating seamless integration into existing workflows. (13) Historical Trend Analysis, as the system may analyze historical access patterns to identify trends and inform current decisions; the system can use past data about access to files/folders/objects/resources in order to predict or estimate the current and future access needs of team-members, and to propose to adjust permissions pro-actively, optimizing access management over time and anticipating organizational shifts and needs. (14) Multi-Language Support, as the LLM's natural language processing capabilities allow it to understand and process inputs in multiple languages (e.g., English, Spanish, French), making the system accessible to diverse global teams; this feature can be particularly valuable for multinational organizations, ensuring consistent access management across different language environments. (15) Cost Reduction and Efficiency Gains, by automating or semi-automating or shortening the access review process; the system can significantly reduce the time and labor costs associated with manual reviews, leveraging its processing and accurate recommendations which can save hours of managerial effort, thereby reducing operational costs while enhancing the overall security and efficiency of access management.

Some embodiments may provide some or all of the following surprising or non-intuitive or counter-intuitive or non-obvious features. (1) Decision Fatigue Mitigation, as the system automates routine access decisions, and thus reduces cognitive overload on managers, who might otherwise default to bulk-approving permissions; the system combats or reduces decision fatigue, leading to more accurate and considered access management without overwhelming human decision-makers. (2) Role-Based Permission Revocation, as contrary to traditional access management, the system can propose proactively to revoke permissions when user roles change, even if the user remains within the organization; this counter-intuitive feature prevents lingering access rights that no longer align with current responsibilities of team-members or with their recently-changed role or tasks. (3) Email Content as Access Criteria, as the system analyzes email messages (and/or IM messages) content to assess a user's ongoing involvement in particular projects or tasks or topics, suggesting access modifications based on communication patterns and based on insights extracted or deduced by the LLM from such messages; this approach is surprising as it uses LLM-based analysis of indirect data (e.g., the content of email messages) to infer access needs accurately, beyond typical role-based evaluations. (4) Context-Aware Feedback Integration, as feedback from Resource Owners is not just recorded but also directly influences future LLM proposals; this dynamic adjustment makes the system increasingly aligned with the unique culture and security expectations of each organization, creating a personalized access management tool. (5) Granular Permission Adjustments, in contrast with conventional broad access reviews; the system can recommend highly specific changes, such as adjusting permissions from "read and write" to "read-only", based on detailed user behavior analysis and recent access events analysis (e.g., a Senior Developer may need read access to a Marketing Plan, and indeed has accessed that Marketing Plan to read it many times in the past month; but did not Write/Modify that Marketing Plan in the past 30 days, and a contextual analysis by the LLM also indicates that a Senior Developer does not need a Write permission towards a Marketing Plan); and this nuanced approach ensures just-enough access without excessive restrictions or leniencies. (6) Trigger Cascading Effects, as some triggers can cascade; a single event (e.g., a departmental transfer) can automatically cause multiple linked or related access reviews; and this interconnected review approach can reveal hidden access dependencies, ensuring all relevant permissions are updated comprehensively rather than in isolation, due to the trigger-based initiation. (7) Learning from Repeated Rejections, the system can learn from repeated rejections of specific recommendations, adapting its logic to avoid suggesting unwanted actions in similar contexts; the iterative learning from negative feedback is non-obvious, turning rejection into a valuable tuning mechanism. (8) Indirect Peer Group Analysis, instead of directly evaluating only formal teams or formally-defined teams (e.g., members of the Sales Department); rather, the system can assess peer interactions to suggest access needs, identifying hidden collaboration links that traditional position-based methods can miss; this unconventional feature helps the system to capture access needs that extend beyond formal organizational structures. (9) Localized Permission Adjustments, as the system can be configured to recommend permission changes based on location data or location-related data, such as restricting access when employees work remotely, or granting access when employees work on-premises/in the office; and this counter-intuitive can feature enhance security by dynamically adjusting permissions according to the user's environment, adding an adaptive layer to access control. (10) Predictive Access Needs, as the system does not only react to changes, but can also predict future or upcoming changes in access requirements by analyzing trends in user behavior/email messages/organizational changes; and this proactive approach can cause the system to suggest permission changes before they are explicitly needed, which is a surprising departure from the typically reactive nature of access management.

In some embodiments, the system can generate some or all of the following innovative and or non-obvious outputs. (1) LLM-generated Access Modification Proposals, including detailed suggestions to modify, revoke, or maintain current permissions, tailored to each user's role, behavior, and access history; these proposals come with supporting evidence and justifications, helping managers make informed decisions quickly without delving into the data manually. (2) Optionally, Confidence Scores may accompany such Recommendations, as each proposal may include a confidence score indicating the system's certainty level in its recommendation; and such score can help decision-makers gauge the reliability of suggestions, adding a layer of transparency and guiding them on which proposals may need closer scrutiny. (3) Textual Justification in the reports, with natural language reports that explain the reasoning behind each access recommendation, including insights into user behavior, recent changes, and policy alignment; this LLM-generated output ensures clarity and accountability, helping Resource Owners understand why specific actions are suggested. (4) Role-Based Access Evolution Reports, as the system may be configured to generate summaries showing how a user's access permissions have evolved over time based on role changes, project involvement, and other factors; and this historical perspective can help managers understand the rationale behind current permissions and anticipate future access needs. (5) Cross-Department Access Analysis, as the system can generate LLM-based reports that identify cross-departmental access patterns, highlighting users who access resources outside their primary domain, and determining via LLM-based analysis whether such cross-department access is indeed required for a user's role/position/task/project; and this output can help managers take corrective actions to minimize unnecessary cross-department access, or to approve or grant such cross-department access when indeed required. (6) Triggered Access Review Logs, as the system provides detailed logs of all triggered access reviews, including the conditions that prompted the review, the LLM's proposals, and the final decisions made; and these logs can provide a clear audit trail for compliance and accountability purposes, and can further be used as part of a feedback loop to improve subsequent LLM-based proposals. (7) Access Policy Compliance Scores, as the system may optionally be configured to evaluate how well current permissions align with defined access policies, optionally presented as an LLM-generated compliance score; and this output can help organizations quickly identify areas where permissions deviate from policy, streamlining the compliance auditing process. (8) Access Scope Reduction Suggestions, generating proposals that are specifically aimed at reducing the scope of permissions (e.g., from full access to read-only access), based on a user's recent activity and/or changes in role; and such targeted reductions can enhance security by limiting access to the minimum necessary for task completion. (9) Feedback Impact Analysis, as the LLM-based report or proposal may indicate how Resource Owner feedback has influenced recent access review outcomes, highlighting adjustments that the system made in response to previous feedback; and this output demonstrates the system's learning ability and helps build trust in the automation process. (10) Peer Group Access Insights, as the LLM-based reports may be based in part on analysis of peer group access behaviors, and can show (directly or indirectly) how access patterns compare among similar roles or departments, or among peer groups, or within members of the same peer group; and this output can identify inconsistencies in access permissions, ensuring equitable and appropriate access across similar user groups. (11) Predictive Access Needs Forecasts, based on observed trends in user behavior, project assignments, and organizational changes, and/or based on insights derived or extracted from LLM analysis of email messages (e.g., an email that Adam sends to Bob, informing that Carl will move to a different department in 14 days); and such proactive and future-looking output can help managers anticipate needs, ensuring permissions are granted or adjusted ahead of actual demand.

Some embodiments may solve or cure or mitigate or prevent some of the following problems or disadvantages. (1) Manual Review Fatigue and Errors, as traditional manual access reviews are labor-intensive, prone to human error, and can result in decision fatigue, leading to oversight of critical permissions; the system of some embodiments automates or semi-automates the review process, reducing errors and ensuring consistent, accurate evaluations without the drawbacks of manual oversight. (2) Outdated or Stale Access Permissions, as users often retain access to resources even after changing roles, leaving projects, or exiting the organization; some embodiments can be configured or triggered to initiates reviews and to adjust permissions based on real-time data or freshly-changed data, preventing users from having access that no longer aligns with their current responsibilities. (3) Excessive Access Levels, where users have more access than necessary, which poses security risks; some embodiments can identify such situations and suggest reducing permission scopes to the minimum required, thereby enhancing security by ensuring that access levels are always appropriate and not excessive. (4) Hidden Cross-Department Access, which can occur without clear oversight, thereby creating potential data security risks; some embodiments can identify such hidden cross-department/cross-team access patterns, allowing managers to revoke or adjust permissions, thus maintaining clear boundaries and preventing unauthorized data exposure. (5) Decision Fatigue Leading to Bulk Approvals, as Resource Owners often bulk-approve access changes due to overwhelming decision volume, risking security breaches; whereas the system of some embodiments provides specific, evidence-backed recommendations that reduce cognitive load, encouraging thoughtful approvals rather than blanket acceptance of all permissions. (6) Inefficient Compliance Audits, as compliance with access control policies is time-consuming and error-prone when done manually; in contrast, the system of some embodiments automatically checks permissions against defined policies, optionally generates compliance scores, and provides detailed reports, streamlining the audit process and ensuring that organizations remain compliant. (7) Delayed Response to Role Changes, as conventional methods provide slow updates to permissions following role or department changes and can leave sensitive data vulnerable; in contrast, the system of some embodiments detects such changes and rapidly suggests permission updates, ensuring that access rights are modified promptly to reflect the user's current position within the organization. (8) Overlooked Unauthorized Access, which often goes neglected until it causes damage; in contrast, the system of some embodiments continuously monitors access events, detecting unauthorized permissions early, and allowing organizations to act quickly to rectify security breaches before they escalate or cause damage. (9) Difficulty in Managing Complex Access Policies, as defining and managing complex access policies across large organizations is challenging and prone to inconsistency; rather, the system of some embodiments simplifies policy management through natural language inputs, ensuring accurate implementation of even the most complex access criteria. (10) Lack of Visibility into Access Trends, such as which users frequently access sensitive data; in contrast, the system of some embodiments can provide trend analysis and historical reports, giving managers insights into access behaviors and helping them make data-driven adjustments to permissions. (11) Delayed Detection of Stale Permissions, such as those retained after project completions, can linger unnoticed; whereas the system of some embodiments proactively identifies stale permissions and suggests timely revocations, ensuring that only active, relevant access is maintained within the organization. (12) Reactive Rather Than Proactive Access Management in conventional systems, only addressing issues once they are identified manually; in contrast, the system of some embodiments can use predictive analysis to anticipate access needs and proactively adjusts permissions, preventing potential security risks before they materialize. (13) High Operational Costs of Manual Reviews, as manual access reviews are costly in terms of time and labor; in contrast, the system of some embodiments automates or semi-automates these processes, significantly reducing operational costs while increasing efficiency, allowing organizations to reallocate resources to more strategic activities. (14) Inconsistent Application of Access Policies, which lead to uneven security standards across an organization or even within the same department or team; in contrast, the system of some embodiments can standardize the review process, ensuring that all permissions align with established policies, and are consistently enforced across all departments and user groups.

Some embodiments may provide a computerized method for automated access permission review in an organization. The method may comprise: receiving a natural language description of an access review policy defining criteria for granting or revoking permissions; collecting organizational data relevant to the policy; analyzing the data using a fine-tuned large language model (LLM); and generating a proposal to modify access permissions with supporting evidence and justification.

Some embodiments may provide a system for managing access permissions within an organization, the system comprising: a data collector to gather user-specific information; a trigger configuration module to initiate access reviews based on predefined conditions; a fine-tuned LLM for analyzing data and proposing access modifications; and a user interface for displaying proposals and facilitating approval or rejection of suggested changes.

Some embodiments may provide a method for performing automated access reviews, comprising: defining access review policies in natural language; automatically initiating reviews based on user role changes, and/or tenure, and/or access activity data, and/or access activity patterns, and/or insights with regard to roles and tasks and responsibilities of users as extracted via LLM analysis of email messages; evaluating access permissions with a fine-tuned LLM; and generating a compliance report that compares current permissions against the defined policies.

Some embodiments may include a system that provides automated recommendations for access permission adjustments, comprising: a role change detector to identify user role transitions; an event logger to monitor access activities; a fine-tuned LLM to analyze role-specific data; and a proposal generator that outputs specific suggestions for modifying, maintaining, or revoking access based on predefined criteria.

Some embodiments may include a method for reducing or preventing unauthorized access to resources in an organization, the method comprising: collecting and embedding access-related data in a vector database; constructing prompts for an LLM that include recent user activities and changes; analyzing these prompts to detect permission anomalies; and generating alerts with proposed corrective actions for review by resource owners, and particularly generating LLM-based proposals for modification/canceling of particular access permissions of particular users or team-members.

Some embodiments may include a system for managing access reviews, comprising: a feedback loop database that stores user feedback on past LLM proposals; a continuous learning module that refines LLM outputs based on the feedback; and a reporting unit that shows how feedback has influenced subsequent access review recommendations, ensuring iterative improvements.

Some embodiments may provide a method for automated detection and correction of stale access permissions, comprising: monitoring organizational data sources for changes in user status, role, or project involvement; using a fine-tuned LLM to evaluate the relevance of existing permissions; and generating a report with suggested modifications, including permission revocations, additions, or scope adjustments.

Some embodiments may include a system for proactive access management, comprising: a predictive analysis unit that forecasts future access needs based on historical trends and current organizational changes; a fine-tuned LLM that generates proposals in anticipation of those needs; and an approval mechanism for resource owners to validate or adjust the predictive permissions.

Some embodiments may provide a computerized and LLM-assisted access review process, comprising: receiving natural language inputs defining which users should have access to specific resources; dynamically constructing review prompts for a fine-tuned LLM based on user behavior and access patterns; and generating detailed, evidence-based proposals to align permissions with organizational security standards.

Some embodiments may include a method for ensuring compliance in access permissions, comprising: integrating with identity and access management systems; continuously reviewing permissions against defined access policies using a fine-tuned LLM; and generating compliance scores and actionable reports that highlight areas where access permissions deviate from established policies.

Some embodiments may include a system for real-time access modification, comprising: an event-based trigger that initiates access reviews when specific changes occur, such as departmental transfers or project completions; a fine-tuned LLM to analyze the impact of these changes on current permissions; and an execution module that implements approved modifications directly into access control systems.

Some embodiments may include a method for managing access permissions with natural language processing, comprising: collecting organizational data related to user roles, communication, and access activities; constructing an access review policy in a natural language format; using a fine-tuned LLM to analyze the data and policy; and generating actionable proposals to add, modify, or revoke access permissions.

In some embodiments, the access review policy includes conditions based on user roles, project assignments, departmental affiliations, or specific time periods during which access is granted or restricted.

In some embodiments, the organizational data collected includes email communications, access logs, identity management records, and data from AD, from AAD, from email messages, from IM messages, from project management systems and documents, Customer Relationship Management (CRM), and/or Enterprise Resource Planning (ERP) systems.

In some embodiments, the method comprises: using a vector database to store embedded representations of the collected data, facilitating efficient retrieval and analysis during access review processes.

In some embodiments, the fine-tuned LLM is trained specifically on access management tasks, utilizing a dataset enriched with organizational access policies, historical access reviews, and expert feedback.

In some embodiments, the method comprises: dynamically generating prompts for the fine-tuned LLM, including user-specific and role-specific context to enhance the accuracy of the access review recommendations.

In some embodiments, the proposal generated includes a confidence score indicating the level of certainty associated with each suggested access modification.

In some embodiments, the method comprises: generating a textual justification for each proposed modification, explaining the reasoning and supporting evidence for each recommended change in natural language.

In some embodiments, the access review process is automatically initiated by triggers based on user role changes, departmental transfers, project completions, or predefined time intervals.

In some embodiments, the collected organizational data is updated continuously or periodically to ensure that the analysis is based on the most current information available.

In some embodiments, the method comprises: integrating feedback from Resource Owners on past recommendations to refine the fine-tuned LLM's outputs in subsequent access reviews.

In some embodiments, the proposal includes recommendations for adjusting the scope of permissions, such as transitioning from read-write access to read-only access, based on recent user activity.

In some embodiments, the method comprises: generating an audit report that documents the access review process, including data collected, analysis performed, and decisions made, for compliance and accountability purposes.

In some embodiments, the LLM-generated proposal identifies and highlights permissions that are outdated, obsolete, or otherwise misaligned with the current access review policy.

In some embodiments, the method comprises: a peer group analysis that evaluates access permissions in the context of similar roles or departments, identifying discrepancies and proposing standardization.

In some embodiments, the proposal includes suggestions for revoking permissions that have not been used within a specified timeframe, indicating potential irrelevance or obsolescence.

In some embodiments, the method comprises: the access review policy can be updated dynamically based on changing organizational needs, with real-time adjustments reflected in the LLM-generated proposals.

In some embodiments, the method comprises: generating alerts or notifications to Resource Owners when critical access modifications are proposed, requiring immediate attention.

In some embodiments, the fine-tuned LLM can process inputs in multiple languages, allowing access review policies and recommendations to be managed in various natural languages.

In some embodiments, the access review policy can specify exclusion criteria, such as excluding users on leave or those with limited tenure, from specific access privileges.

In some embodiments, the method comprises: identifying and proposing corrective actions for access permissions that do not comply with organizational security standards or regulatory requirements.

In some embodiments, the LLM-generated proposal may optionally include integrated hyperlinks or shortcuts that allow Resource Owners to approve, reject, or modify recommended changes directly within the review report.

In some embodiments, the method comprises a predictive analysis to forecast future access needs based on observed trends in user behavior, role changes, and project involvement.

In some embodiments, the LLM-generated proposal includes comparisons with past access review outcomes, providing context for how permissions have evolved over time and justifying current recommendations.

In some embodiments, the method uses a feedback loop that automatically adjusts the fine-tuned LLM's analysis parameters based on the outcomes of previous access reviews and Resource Owner inputs.

In some embodiments, the system may optionally perform Behavioral Access Pattern Learning, as a feature that uses machine learning to continuously learn and adapt based on user behavior patterns over time. By identifying normal and abnormal access activities, the system can proactively suggest modifications to permissions and/or can automatically adjust permissions, improving security by detecting and mitigating insider threats early.

In some embodiments, optionally, the system may provide or enable or utilize Real-Time Access Modification Execution, via an automated execution module that can immediately implement approved access permission changes in real time across all integrated systems, reducing the delay between proposal and action. This feature ensures that permissions are instantly updated, enhancing security and operational efficiency without waiting for manual confirmation.

In some embodiments, optionally, the system may include a module for Access Impact Simulation, as a simulation tool that predicts the impact of proposed permission changes before they are implemented. This optional feature may allow Resource Owners to see or to estimate how proposed modifications to access permissions might affect workflows, collaboration, or data access, helping prevent disruptions and ensuring that changes are beneficial before they are enacted.

Some embodiments may optionally implement, or may support, Dynamic Access Policies Based on User Location, or other location-based or location-aware or geo-location-based modifications or proposals with regard to access permission. For example, integrated location-based access controls may adjust permissions dynamically, depending on whether users are in-office, working remotely (e.g., from home), or traveling internationally (e.g., at a remote branch office, or from a remote hotel or airport). This feature may further enhance security if such location-based criteria are defined in the Access Review Policy, ensuring that sensitive data is protected when users are outside particular or controlled locations.

Some embodiments may enforce or implement modules to ensure Cross-System Access Harmonization within multiple information systems/computerized systems of the same organization; by implementing cross-system harmonization that standardizes access permissions across different applications and platforms. This module may be configured to ensure consistent access control policies organization-wide, preventing conflicts in which a particular user might have different access levels in different systems, enhancing overall security and compliance management.

In some embodiments, optionally, the system may extract and utilize Sentiment Analysis of Feedback. For example, the LLM may perform sentiment analysis of Resource Owner feedback in order to better understand user confidence and satisfaction with the LLM's recommendations or proposals. By analyzing positive, neutral, or negative feedback trends, the system and the LLM can adjust their learning algorithms to improve user trust and refine the relevance of future proposals.

Some embodiments may provide a computerized method for automated Access Permissions Review in an organization. The computerized method comprises: (a) receiving a natural language textual description of an Access Review Policy, that describes in a natural language a plurality of criteria for providing Access Permissions to organizational users towards an Organizational Resource based on a set of characteristics that are defined in a natural language; (b) constructing a trigger for automatically initiating an Access Review process. The method further comprises (c) automatically collecting organizational data that pertains to: (i) roles and positions of users in the organization, (ii) user-specific characteristics of one or more of said users, (iii) email messages sent by one or more of said users, (iv) email messages received by one or more of said users, and (v) description of events in which one or more of said users have accessed one or more elements of said Organizational Resource. The method further comprises: (d) upon a triggering of said trigger, performing: (d1) providing to a fine-tuned Large Language Model (LLM), at least (I) said Access Review Policy, and (II) augmentation data from said organizational data, and (III) a prompt instructing said fine-tuned LLM to generate a proposal to revoke, modify, add or maintain one or more of the Access Permissions of a particular user, and further instructing said fine-tuned LLM to generate output in said natural language that describes reasoning and supporting evidence for said proposal; (d2)

obtaining from said fine-tuned LLM an LLM-generated report that includes said proposal and said reasoning and supporting evidence.

In some embodiments, step (c) of collecting the organizational data comprises at least: (c1) collecting data from an Active Directory (AD) of said organization; and (c2) collecting data that describes an organizational structure of said organization.

In some embodiments, step (c) of collecting the organizational data further comprises: (c3) collecting data from email messages exchanged by users of said organization.

In some embodiments, step (c) of collecting the organizational data further comprises: (c4) if said organization utilizes a Customer Relationship Management (CRM) system, then collecting data about users of the organization from said CRM system; (c5) if said organization utilizes an Enterprise Resource Planning (ERP) system, then collecting data about users of the organization from said ERP system; (c6) if said organization monitors peer relations among users of said organization, then collecting data indicating that a particular user belongs to a particular peer group in said organization.

In some embodiments, step (c) of collecting the organizational data further comprises: (c7) monitoring access of users in the organization to elements of said Organizational Resource, including at least to one or more files or folders that are associated with said Organizational Resource; and collecting data indicating that a particular user has accessed a particular element of said Organizational Resource at a particular time.

In some embodiments, step (c) of collecting the organizational data further comprises: constructing a first Vector Database that represents data extracted from: (i) email messages exchanged by users of said organization, and (ii) access events in which users have accessed files and objects that are associated with said Organizational Resource.

In some embodiments, the method further comprises: providing to said fine-tuned LLM augmentation data that is based on said first Vector Database.

In some embodiments, step (c) of collecting the organizational data further comprises: constructing a second Vector Database that represents data extracted from training examples of Access Review Policies and correct Access Review decisions.

In some embodiments, the method further comprises: providing to said fine-tuned LLM augmentation data that is based on said second Vector Database.

In some embodiments, the method further comprises: (e1) receiving from an Access Review decision-maker a feedback indicating acceptance or rejection of said proposal that was generated by the fine-tuned LLM; (e2) feeding said feedback into a feedback loop database; (e3) in a subsequent iteration of Access Review that utilizes said fine-tuned LLM, providing to said fine-tuned LLM augmentation information from a Retrieval-Augmented Generation (RAG) unit that utilizes said feedback loop database.

In some embodiments, the method comprises: based on LLM-analysis of organizational data collected in step (c), generating by said fine-tuned LLM an output that reflects at least: a proposal to revoke an access permission of a particular user based on a recent change of role of said particular user in said organization; and further providing by said fine-tuned LLM information that supports said proposal.

In some embodiments, the method comprises: based on LLM-analysis of organizational data collected in step (c), generating by said fine-tuned LLM an output that reflects at least: a proposal to revoke an access permission of a particular user based on a change in access events of said particular user to files and folders of said Organizational Resource; and further providing by said fine-tuned LLM information that supports said proposal.

In some embodiments, the method comprises: based on LLM-analysis of organizational data collected in step (c), generating by said fine-tuned LLM an output that reflects at least: a proposal to maintain an access permission of a particular user based on frequent access events of said particular user to files and folders of said Organizational Resource; and further providing by said fine-tuned LLM information that supports said proposal.

In some embodiments, the method comprises: based on LLM-analysis of organizational data collected in step (c), generating by said fine-tuned LLM an output that reflects at least: a proposal to maintain an access permission of a particular user based on LLM-based analysis of email messages that were sent to said particular users and were received by said particular user, wherein the LLM-based analysis of said email messages indicates that said particular user has an actual need to access said Organizational Resource.

In some embodiments, the method comprises: based on LLM-analysis of organizational data collected in step (c), generating by said fine-tuned LLM an output that reflects at least: a proposal to revoke an access permission of a particular user based on LLM-based analysis of email messages that were sent to said particular users and were received by said particular user, wherein the LLM-based analysis of said email messages indicates that said particular user no longer has an actual need to access said Organizational Resource.

In some embodiments, LLM-based analysis of organizational data that was collected in step (c), takes into account at least: a length of time that a particular user has been with said organization.

In some embodiments, LLM-based analysis of organizational data that was collected in step (c), takes into account at least: (i) a current role or title or position of said particular user in said organization; and (ii) recent changes in role or title or position of said particular user in said organization.

In some embodiments, the method comprises: automatically constructing said trigger based on LLM analysis of the Access Review Policy, by using conditions and criteria that the LLM analysis deduced from the Access Review Policy as triggering parameters for said trigger. In some embodiments, this may be performed by a secondary LLM that is specifically pre-trained on examples of trigger definitions and their respective Access Review Policy textual descriptions, and/or such secondary LLM that is specifically fine-tuned on said examples to specialize in the task of defining and generating a trigger based on a given Access Review Policy.

In some embodiments, the method further comprises: performing an LLM grounding process, that constrains at least one of: (i) information that is fed to the fine-tuned LLM as part of an augmented prompt or as LLM context, (ii) outputs that are generated by the fine-tuned LLM. The LLM grounding process is performed based on one or more pre-defined LLM grounding rules or an LLM grounding policy.

Some embodiments provide a system comprising: one or more hardware processors, that are configured to execute code, and that are operably associated with one or more memory units; wherein the one or more hardware processors are configured to perform a method as described.

Some embodiments provide a non-transitory storage medium having stored thereon instructions that, when executed by a machine, cause the machine to perform a method as described.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be implemented by using hardware units, software units, processors, CPUs, DSPs, GPUs, integrated circuits (ICs), memory units, storage units, wireless communication modems or transmitters or receivers or transceivers, cellular transceivers, a power source, input units, output units, Operating System (OS), drivers, applications, and/or other suitable components.

Some embodiments may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Some embodiments may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) or Virtual Reality (VR) or Mixed Reality (XR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of some embodiments may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of some embodiments may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit, a Flash drive), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Dart, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results (e.g., within a pre-defined threshold level of similarity; such as, within 5 percent above or below a pre-defined threshold value), among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items"includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A computer-implemented method for automated Access Permissions Review in an organization, the method comprising:

(a) receiving a natural language textual description of an Access Review Policy, that describes in a natural language a plurality of criteria for providing Access Permissions to organizational users towards an Organizational Resource based on a set of characteristics that are defined in a natural language;

(b) constructing a trigger for automatically initiating an Access Review process;

(c) automatically collecting organizational data that pertains to:

(i) roles and positions of users in the organization, (ii) user-specific characteristics of one or more of said users, (iii) email messages sent by one or more of said users, (iv) email messages received by one or more of said users, and (v) description of events in which one or more of said users have accessed one or more elements of said Organizational Resource;

(d) upon a triggering of said trigger, performing:

(d1) providing to a fine-tuned Large Language Model (LLM), at least (I) said Access Review Policy, and (II) augmentation data from said organizational data, and (III) a prompt instructing said fine-tuned LLM to generate a proposal to revoke, modify, add or maintain one or more of the Access Permissions of a particular user, and further instructing said fine-tuned LLM to generate output in said natural language that describes reasoning and supporting evidence for said proposal;

(d2) obtaining from said fine-tuned LLM an LLM-generated report that includes said proposal and said reasoning and supporting evidence;

(e) receiving from an Access Review decision-maker an indication of acceptance or rejection of said proposal; and (f) implementing a feedback loop using the indication to provide feedback information to the fine-tuned LLM and to further train and improve performance of the fine-tuned LLM.

2. The method of claim 1,
wherein step (c) of collecting the organizational data comprises at least:

(c1) collecting data from an Active Directory (AD) of said organization; and (c2) collecting data that describes an organizational structure of said organization.

3. The method of claim 2,
wherein step (c) of collecting the organizational data further comprises:

(c3) collecting data from email messages exchanged by users of said organization.

4. The method of claim 3,
wherein step (c) of collecting the organizational data further comprises:

(c4) if said organization utilizes a Customer Relationship Management (CRM) system, then collecting data about users of the organization from said CRM system;

(c5) if said organization utilizes an Enterprise Resource Planning (ERP) system, then collecting data about users of the organization from said ERP system;

(c6) if said organization monitors peer relations among users of said organization, then collecting data indicating that said particular user belongs to a particular peer group in said organization.

5. The method of claim 4,
wherein step (c) of collecting the organizational data further comprises:

(c7) monitoring access of users in the organization to elements of said Organizational Resource, including at least to one or more files or folders that are associated with said Organizational Resource; and collecting data indicating that said particular user has accessed a particular element of said Organizational Resource at a particular time.

6. The method of claim 2,
wherein step (c) of collecting the organizational data further comprises:
constructing a first Vector Database that represents data extracted from: (i) email messages exchanged by users of said organization, and (ii) access events in which users have accessed files and objects that are associated with said Organizational Resource.

7. The method of claim 6, further comprising:
providing to said fine-tuned LLM augmentation data that is based on said first Vector Database.

8. The method of claim 7,
wherein step (c) of collecting the organizational data further comprises:
constructing a second Vector Database that represents data extracted from training examples of Access Review Policies and correct Access Review decisions.

9. The method of claim 8, further comprising:
providing to said fine-tuned LLM augmentation data that is based on said second Vector Database.

10. The method of claim 1, wherein said implementing the feedback loop includes:

(f1) storing the indication of acceptance or rejection in a feedback loop database;

(f2) retrieving information from the feedback loop database by a Retrieval-Augmented Generation (RAG) unit; and (f3) generating, by the RAG unit, said feedback information to further train the fine-tuned LLM.

11. The method of claim 10, wherein the further training of the fine-tuned LLM is performed in a subsequent iteration of Access Review that utilizes said fine-tuned LLM.

12. The method of claim 1, comprising:
based on LLM-analysis of organizational data collected in step (c),
generating by said fine-tuned LLM an output that reflects at least: a proposal to revoke an access permission of said particular user based on a recent change of role of said particular user in said organization; and further providing by said fine-tuned LLM information that supports said proposal; or
generating by said fine-tuned LLM an output that reflects at least: a proposal to revoke an access permission of said particular user based on a change in access events of said particular user to files and folders of said Organizational Resource; and further providing by said fine-tuned LLM information that supports said proposal; or generating by said fine-tuned LLM an output that reflects at least: a proposal to maintain an access permission of said particular user based on frequent access events of said particular user to files and folders of said Organizational Resource; and further providing by said fine-tuned LLM information that supports said proposal.

13. The method of claim 1, comprising:

based on LLM-analysis of organizational data collected in step (c), generating by said fine-tuned LLM an output that reflects at least: a proposal to maintain an access permission of said particular user based on LLM-based analysis of email messages that were sent to said particular user and were received by said particular user, wherein the LLM-based analysis of said email messages indicates that said particular user has an actual need to access said Organizational Resource.

14. The method of claim 1, comprising:

based on LLM-analysis of organizational data collected in step (c), generating by said fine-tuned LLM an output that reflects at least: a proposal to revoke an access permission of said particular user based on LLM-based analysis of email messages that were sent to said particular user and were received by said particular user, wherein the LLM-based analysis of said email messages indicates that said particular user no longer has an actual need to access said Organizational Resource.

15. The method of claim 1, wherein LLM-based analysis of organizational data that was collected in step (c), takes into account at least: (i) a length of time that said particular user has been with said organization, or (ii) a current role or title or position of said particular user in said organization, and recent changes in role or title or position of said particular user in said organization.

16. The method of claim 1, comprising:

automatically constructing said trigger based on LLM analysis of the Access Review Policy, by using conditions and criteria that the LLM analysis deduced from the Access Review Policy as triggering parameters for said trigger.

17. The method of claim 1, further comprising:

performing an LLM grounding process, that constrains at least one of:

(i) information that is fed to the fine-tuned LLM as part of an augmented prompt or as LLM context, (ii) outputs that are generated by the fine-tuned LLM, based on one or more pre-defined LLM grounding rules or an LLM grounding policy.

18. The method of claim 1, wherein step (c) includes accessing a Retrieval Augmented Generation (RAG) enhanced prompt reflecting patterns or trends derived from one or more user behaviors.

19. A system comprising:

one or more hardware processors, that are configured to execute code, and that are operably associated with one or more memory units;

wherein the one or more hardware processors are configured to perform a method for automated Access Permissions Review in an organization, the method comprising:

(a) receiving a natural language textual description of an Access Review Policy, that describes in a natural language a plurality of criteria for providing Access Permissions to organizational users towards an Organizational Resource based on a set of characteristics that are defined in a natural language;

(b) constructing a trigger for automatically initiating an Access Review process;

(c) automatically collecting organizational data that pertains to:

(i) roles and positions of users in the organization, (ii) user-specific characteristics of one or more of said users, (iii) email messages sent by one or more of said users, (iv) email messages received by one or more of said users, and (v) description of events in which one or more of said users have accessed one or more elements of said Organizational Resource;

(d) upon a triggering of said trigger, performing:

(d1) providing to a fine-tuned Large Language Model (LLM), at least (I) said Access Review Policy, and (II) augmentation data from said organizational data, and (III) a prompt instructing said fine-tuned LLM to generate a proposal to revoke, modify, add or maintain one or more of the Access Permissions of a particular user, and further instructing said fine-tuned LLM to generate output in said natural language that describes reasoning and supporting evidence for said proposal;

(d2) obtaining from said fine-tuned LLM an LLM-generated report that includes said proposal and said reasoning and supporting evidence;

(e) receiving from an Access Review decision-maker an indication of acceptance or rejection of said proposal; and (f) implementing a feedback loop using the indication to provide feedback information to the fine-tuned LLM and to further train and improve performance of the fine-tuned LLM.

20. A non-transitory storage medium having stored thereon instructions that, when executed by a machine, cause the machine to perform a method for automated Access Permissions Review in an organization, the method comprising:

(a) receiving a natural language textual description of an Access Review Policy, that describes in a natural language a plurality of criteria for providing Access Permissions to organizational users towards an Organizational Resource based on a set of characteristics that are defined in a natural language;

(b) constructing a trigger for automatically initiating an Access Review process;

(c) automatically collecting organizational data that pertains to:

(i) roles and positions of users in the organization, (ii) user-specific characteristics of one or more of said users, (iii) email messages sent by one or more of said users, (iv) email messages received by one or more of said users, and (v) description of events in which one or more of said users have accessed one or more elements of said Organizational Resource;

(d) upon a triggering of said trigger, performing:

(d1) providing to a fine-tuned Large Language Model (LLM), at least (I) said Access Review Policy, and (II) augmentation data from said organizational data, and (III) a prompt instructing said fine-tuned LLM to generate a proposal to revoke, modify, add or maintain one or more of the Access Permissions of a particular user, and further instructing said fine-tuned LLM to generate output in said natural language that describes reasoning and supporting evidence for said proposal;

(d2) obtaining from said fine-tuned LLM an LLM-generated report that includes said proposal and said reasoning and supporting evidence;

(e) receiving from an Access Review decision-maker an indication of acceptance or rejection of said proposal; and (f) implementing a feedback loop using the indication to provide feedback information to the fine-tuned LLM and to further train and improve performance of the fine-tuned LLM.

\* \* \* \* \*